April 22, 1958  E. H. SHRIMPTON  2,831,703
PEDAL DRIVEN VEHICLE
Filed March 18, 1955  2 Sheets-Sheet 1
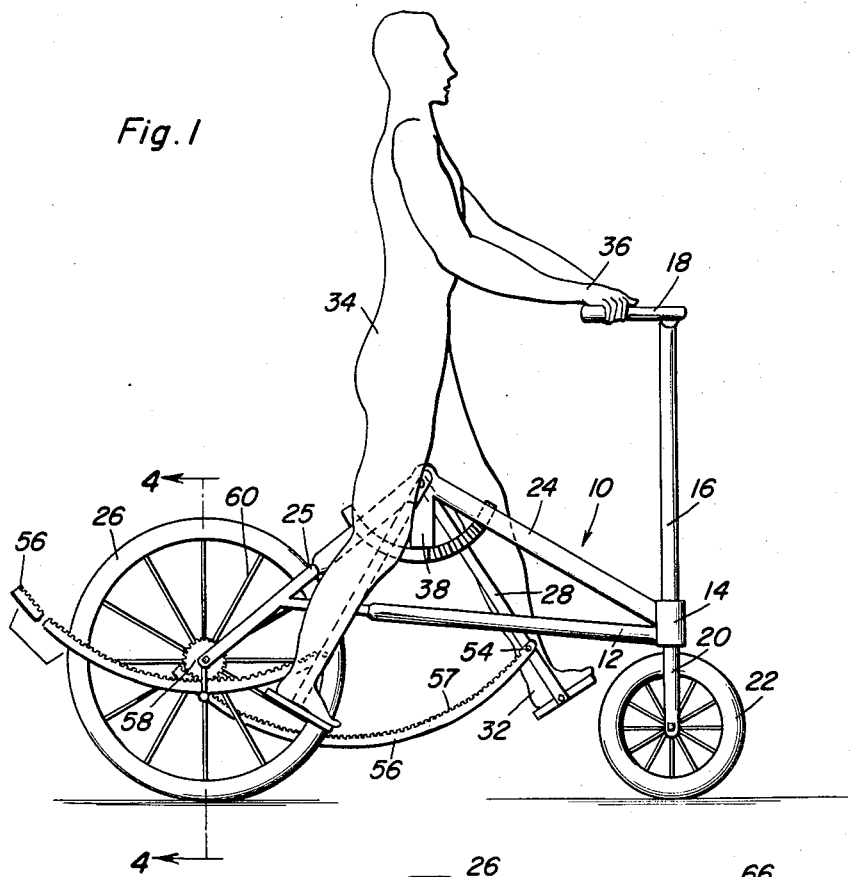
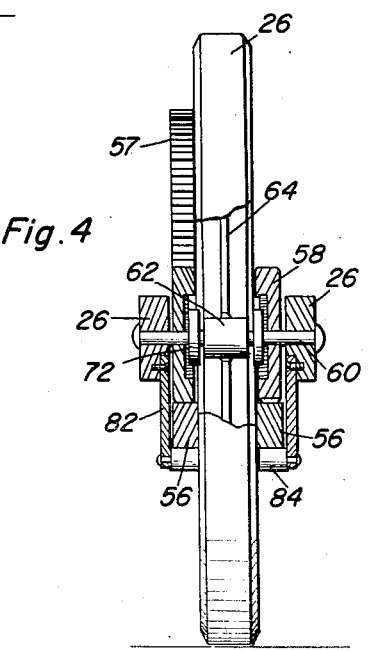
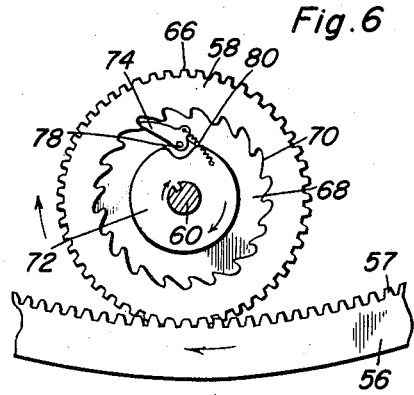
Edwin H. Shrimpton
INVENTOR.

April 22, 1958　　　E. H. SHRIMPTON　　　2,831,703
PEDAL DRIVEN VEHICLE

Filed March 18, 1955　　　2 Sheets-Sheet 2

Edwin H. Shrimpton
INVENTOR.

BY Clarence A. O'Brien
and Harvey B. Jacobson
Attorneys

United States Patent Office 2,831,703
Patented Apr. 22, 1958

2,831,703

PEDAL DRIVEN VEHICLE

Edwin H. Shrimpton, Euclid, Ohio

Application March 18, 1955, Serial No. 495,193

3 Claims. (Cl. 280—254)

This invention generally relates to a pedal driven vehicle, and more specifically provides a device to provide locomotion of a person on the vehicle by means of energy supplied by such person.

An object of the present invention is to provide a pedal driven vehicle in which energy is supplied to the vehicle by the person moving the legs and feet in a manner which simulates the act of walking.

Another object of the present invention is to provide a pedal driven vehicle in which the energy is supplied by movement simulating walking wherein the speed of movement is multiplied from that normally attained by walking without the exertion of any more force than normally employed during walking.

Other important objects of the present invention will reside in its simplicity of construction, light weight, portability, relatively small size, easy steerage, safe operation and relatively inexpensive manufacturing and operating costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the pedal driven vehicle of the present invention showing a person positioned thereon in the normal operating position;

Figure 4 is a vertical sectional view taken substantially upon a plane passing along section line 4—4 of Figure 1, showing the details of construction of the driving wheel mechanism;

Figure 2:
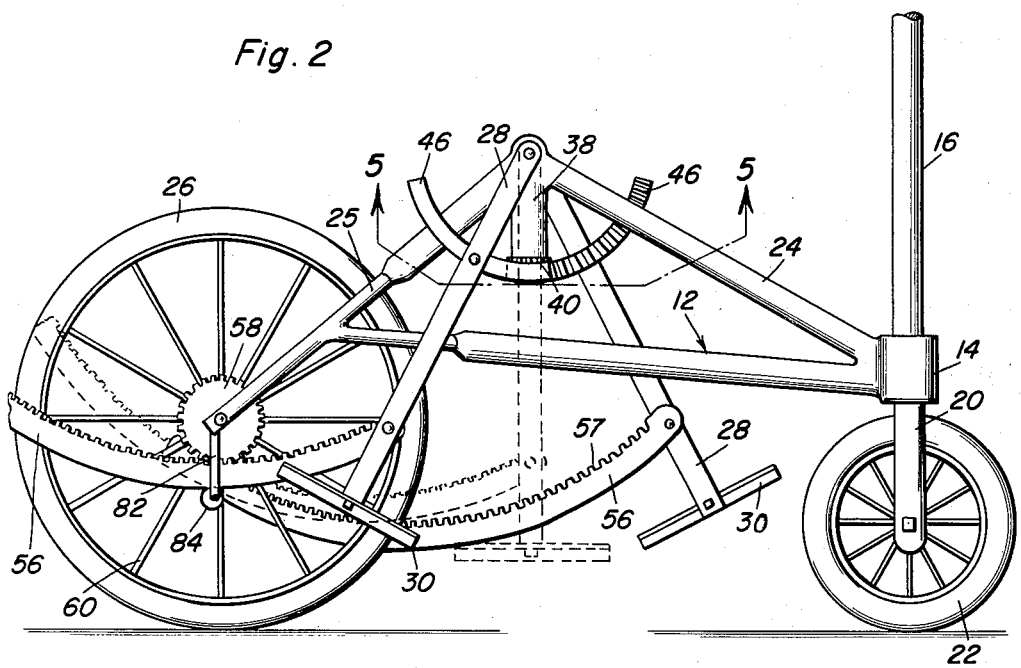
Figure 2 is an enlarged side elevational view showing the details of construction and the manner of movement of the propelling mechanism of the pedal driven vehicle.
Figure 3:
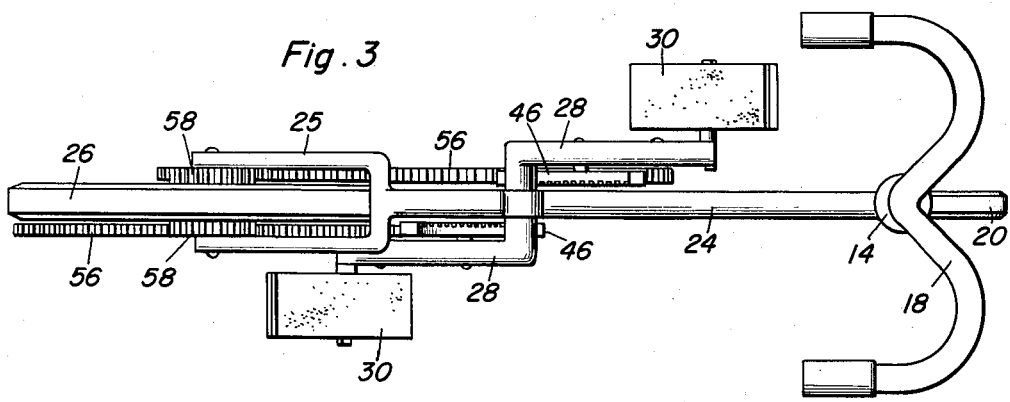
Figure 3 is a top plan view of the vehicle with the person removed therefrom.
Figure 5:
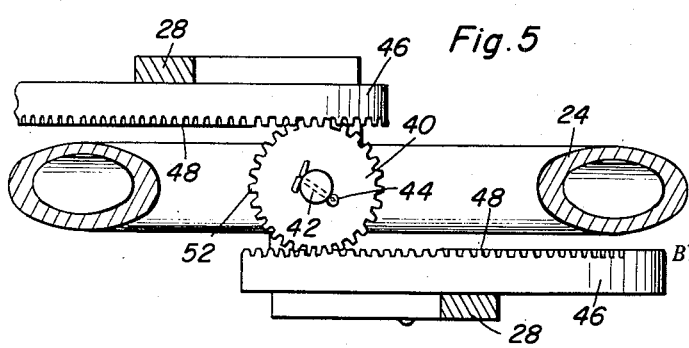

Figure 5 is a plan sectional view taken substantially upon a plane passing along section line 5—5 of Figure 2, showing the details of construction of the interconnecting means between the arms for correlating the movement thereof; and Figure 6 is a detail view showing the construction of one of the ratchet gears in meshing engagement with the elongated arcuate rack for transmitting the oscillating motion of the rack to a uni-directional motion of the driving wheel.

Referring now specifically to the drawings, it will be seen that the numeral 10 generally designates the pedal driven vehicle of the present invention including an upstanding frame member 12 having a forwardly positioned sleeve 14 receiving an upstanding member 16 having handle bars 18 on the upper end thereof and an inverted U-shaped yoke 20 on the lower end thereof for receiving and supporting a ground engaging steering wheel 22. The frame 12 is also provided with upwardly converging members 24 and a rearwardly and downwardly extending U-shaped yoke 25 for rotatably supporting a ground engaging driving wheel 26, whereby the vehicle 10 somewhat simulates the appearance of a bicycle in that it has a central frame and a forward steering wheel and a rear driving wheel.

Pivotally secured to the apex of the upwardly inclined members 24 is a pair of suspended arm members 28 which are disposed on opposite sides of the frame 12 and which pivot independently of each other. Rigidly secured to the outer end of each of the arms 28 is a pedal 30 for receiving the foot 32 of the operator 34 of the vehicle. Of course, the operator 34 positions his hands 36 on the handle bars 18 for guiding the vehicle 10.

Depending from the apex of the upwardly inclined members 24 is a cylindrical boss 38 having a pinion gear 40 rotatably journaled on a reduced portion 42 and held thereon by fastening members, such as cotter pins 44. The pinion gear 40 is in meshing engagement with rigid inwardly facing arcuate rack members 46 which are mounted adjacent their midpoints to the arms 28, whereby the inwardly facing racks 46 are provided with teeth 48 on the inner ends thereof for engagement with the teeth 50 on the pinion gear 40, whereby movement of one of the racks 46 in a rearward direction will cause the other of the racks 46 to move in a forward direction since they engage opposite sides of the idler pinion gear 40. It will be understood that the teeth 48 and 52 are so formed that arcuate movement of the arms 28 is permitted and correlated, wherein rearward movement of one of the arms 28 will cause forward movement of the other of the arms 28 substantially in the nature of legs when a person walks, whereby walking movement of the operator's legs or feet 32 will cause sequential oscillation of the arms 28 about the pivot axis at the apex of the upwardly inclined members 24.

Pivotally secured to each of the arms 28 in spaced relation to the lower end thereof by pivot pins 54 is a pair of elongated arcuate racks 56 having teeth 58 on the upper concave edge thereof. These racks 56 extend rearwardly adjacent each side of the driving wheel 26 and engage ratchet gears 58 disposed on each side of the wheel 26 and journaled on the transverse axle 60 which forms a central hub 62 joined to the spokes 64 for supporting the periphery of the driving wheel 26. Each of the ratchet gears 58 is provided with peripheral teeth 66 for meshing engagement with the teeth 58 on the racks 56, and each of the pinion gears 58 is provided with an internal recess 68 on the inner face thereof having a plurality of ratchet notches or teeth 70 about the periphery of the recess 68. A central member 72 is secured to the axle 60 for rotation therewith, and the member 72 is provided with a pivotal pawl 74 mounted on a pivot pin 78 urged towards the ratchet teeth 70 by a tension coil spring 80, wherein during one direction of rotation of the ratchet gear 58, the dog or pawl 74 will engage the ratchet teeth 70 for rotating the axle 60 in this one direction. When the ratchet gear 58 is moved in the other direction, the dog or pawl 74 will pivot inwardly, thereby permitting relative rotation between the ratchet gear 58 and the axle 60.

For retaining the teeth 57 on the racks 56 in meshing engagement with the teeth 66 on the ratchet gears 58, a depending bracket 82 is provided at the lower end of the yoke 25 on each side of the wheel 26 in depending relation, and the brackets 82 are provided with inwardly extending rollers 84 at the lower end thereof for rollingly engaging the lower convex edge of the racks 56, thereby assuring that the racks 56 will stay in meshing engagement with the ratchet gears 58.

In operation, the operator 34 positions himself on the vehicle 10 substantially as illustrated in Figure 1, and guides the forward motion of the vehicle 10 in an obvious manner by utilizing the handle bars 18. To propel the vehicle 10, the operator 34 simulates the act of walking, wherein the feet 32 oscillate substantially about a point formed by the hip of the operator 34 wherein the arms 28 will be sequentially urged rearwardly by rearward pressure on the pedals 30 by the feet 32. The rearward pressure on alternate arms 28 will cause alternate rearward movement of the racks 56 for rotating the wheel 26 in a single direction. The alternate oscillation of the arms 28 is assured by the idler pinion 40 in meshing engagement with the racks 46 secured rigidly to the arms 28 in meshing engagement with opposite sides of the gear 40. As the racks 56 alternately move rearwardly, the ratchet gears 58 will be moved substantially as illustrated in Figure 6, whereby driving force will be transmitted to the wheel 26. When the same rack moves forwardly, the dog or pawl 74 permits relative rotation between the ratchet gear 58 and the axle 60, thereby permitting the rack 56 to move forwardly while the other rack 56 is moving rearwardly, thereby forming substantially a continuous power source whereby the speed of the vehicle will be controlled by the particular size of the ratchet gears 58 and also the length of the arms 28 and the swinging movement caused by the legs of the operator 34. Accordingly, it will be seen that the vehicle 10 of the present invention provides a pedal driven vehicle which simulates the act of walking and in which the speed normally attained by walking will be multiplied without the exertion of any more energy than normally consumed during walking.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A pedal driven vehicle comprising an upstanding frame, a ground engaging steerable wheel and a ground engaging driving wheel mounted on said frame, a pair of suspended arms pivotally mounted on said frame at their upper ends, a foot pedal mounted on the lower end of each of said arms for oscillating said arm, and means interconnecting said arms and the driving wheel to transmit the oscillating motion of said arms to uni-directional rotational movement of said wheel whereby said vehicle will be propelled by a simulated walking motion of the person operating the vehicle, said frame having means interconnecting the arms for moving one arm in opposite direction to the direction of movement of the other arm whereby the arms will simulate action of a person's leg during walking with the angular movement of the arms being substantially equal on each side of a transverse vertical plane through the pivotal connection between the arms and the frame, said arm interconnecting means including an inwardly facing arcuate rack on each arm, and a pinion gear journaled on said frame between said racks and in meshing engagement therewith, said arm and driving wheel interconnecting means including an elongated upwardly facing arcuate rack pivotally attached at one end thereof to each of said arms, said wheel having a pair of ratchet gears in meshing engagement with said elongated racks, said ratchet gears and elongated racks being disposed on opposite sides of said wheel, said ratchet gear transmitting power to said wheel when the arms are moved rearwardly.

2. A pedal driven vehicle adapted to be propelled by a standing operator moving his legs to simulate a walking action, said vehicle comprising an elongated frame having a steerable wheel mounted at the front end thereof, handle bar means for controlling steering movement of the steerable wheel, a driving wheel mounted adjacent the rear of said frame, a pair of arms suspended from said frame for oscillation about a common transverse axis, a pedal on the lower end of each arm, means interconnecting the arms and the driving wheel to transmit the oscillation of the arms to unidirectional rotation of said driving wheel for propelling the vehicle, and means interconnecting said arms for oscillating the arms simultaneously in opposite directions, the angular movement of said arms being substantially equal on each side of a vertical plane passing through the common axis thereby simulating the movement of the legs of the standing operator whereby the common axis is adapted to be disposed between the legs of the operator adjacent the upper ends thereof.

3. The combination of claim 2 wherein said means interconnecting the pivotal arms includes an inwardly facing arcuate rack on the inside of each arm, and an idler gear journaled on said frame in meshing engagement with said racks whereby the rack and arm on one side of the gear will move in one direction simultaneous with movement of the rack and arm on the opposite side of the gear in the opposite direction.

References Cited in the file of this patent

UNITED STATES PATENTS

| 290,576 | Hambly | Dec. 18, 1883 |
| 1,072,284 | Widera | Sept. 2, 1913 |
| 2,723,131 | McChesney | Nov. 8, 1955 |

FOREIGN PATENTS

| 98,151 | Germany | Jan. 25, 1895 |
| 5,863 | Norway | Dec. 6, 1897 |